United States Patent
Hoffend, Jr.

(10) Patent No.: US 9,605,831 B2
(45) Date of Patent: Mar. 28, 2017

(54) LIGHT DUCT HOMOGENIZER

(71) Applicant: 3M INNOVATIVE PROPERTIES COMPANY, St. Paul, MN (US)

(72) Inventor: Thomas R. Hoffend, Jr., Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 105 days.

(21) Appl. No.: 14/382,775

(22) PCT Filed: Feb. 25, 2013

(86) PCT No.: PCT/US2013/027595
§ 371 (c)(1),
(2) Date: Sep. 4, 2014

(87) PCT Pub. No.: WO2013/138054
PCT Pub. Date: Sep. 19, 2013

(65) Prior Publication Data
US 2015/0049493 A1 Feb. 19, 2015

Related U.S. Application Data

(60) Provisional application No. 61/609,502, filed on Mar. 12, 2012.

(51) Int. Cl.
*F21V 7/00* (2006.01)
*F21V 8/00* (2006.01)
(Continued)

(52) U.S. Cl.
CPC ............. *F21V 7/0033* (2013.01); *F21V 7/05* (2013.01); *G02B 6/0096* (2013.01);
(Continued)

(58) Field of Classification Search
CPC  G02B 6/0036; G02B 6/12004; G02B 6/0096; G02B 6/02; F21S 11/007; F21V 7/05
(Continued)

(56) References Cited

U.S. PATENT DOCUMENTS

| 6,149,289 A | 11/2000 | Kuramitsu | |
|---|---|---|---|
| 2005/0179873 A1* | 8/2005 | Yamasaki | G03B 21/26 353/94 |
| 2008/0018999 A1 | 1/2008 | Schuck | |

FOREIGN PATENT DOCUMENTS

| CN | 101248384 | 8/2008 |
|---|---|---|
| EP | 2385297 | 11/2011 |

(Continued)

OTHER PUBLICATIONS

International Search Report for PCT International Application No. PCT/US2013/027595, mailed on May 15, 2013, 3pgs.

*Primary Examiner* — Anh Mai
*Assistant Examiner* — Matthew Peerce
(74) *Attorney, Agent, or Firm* — Jeffrey S. Kollodge (57) ABSTRACT

The present disclosure provides a novel construction for homogenizing light in a mirror-lined light duct, in particular such as in a light duct having an increase in the cross-sectional duct area in the light propagation direction. The present disclosure also provides for an apparatus for light homogenization after a portion of the light in a duct has been extracted from the duct and/or diverted to a side duct.

17 Claims, 9 Drawing Sheets

(51) Int. Cl.
*G02B 27/09* (2006.01)
*G02B 27/14* (2006.01)
*F21V 7/05* (2006.01)

(52) U.S. Cl.
CPC ....... *G02B 27/0994* (2013.01); *G02B 27/143* (2013.01); *G02B 6/0018* (2013.01)

(58) Field of Classification Search
USPC .......................................................... 362/341
See application file for complete search history.

(56) References Cited

FOREIGN PATENT DOCUMENTS

| WO | WO 2006/086458 | 8/2006 |
|----|----------------|--------|
| WO | WO 2012-138503 | 10/2012 |
| WO | WO 2012-138595 | 10/2012 |

* cited by examiner

LIGHT DUCT HOMOGENIZER

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported.

SUMMARY

The disclosure generally relates to light duct light homogenizers that are capable of homogenizing the cross-sectional flux of light for light propagating within a light duct, as the cross-sectional area of the duct is increased. In particular, in one aspect, the present disclosure provides a light duct homogenizer that includes an inlet light duct having a first surface and an opposing second surface disposed at an inlet light duct height from the first surface; and an outlet light duct contiguous with the first surface and having an opposing third surface disposed at an outlet light duct height from the first surface, the outlet light duct height being greater than the inlet light duct height. The light duct homogenizer further includes a first light diverter forming a 45 degree angle between the second surface and the third surface; and a second light diverter disposed parallel to the first light diverter, the second light diverter contacting the first surface and positioned such that a portion of a light beam propagating from the inlet light duct to the outlet light duct that reflects from the second light diverter, also reflects from the first light diverter. In another aspect, the present disclosure provides a light distribution system that includes the light duct homogenizer.

In another aspect, the present disclosure provides a light distribution system that includes an inlet light duct having a first surface and an inlet light duct height perpendicular to the first surface, the inlet light duct capable of transporting an input light beam along a first propagation direction parallel to the first surface. The light distribution system further includes a light extractor disposed in the inlet light duct, the light extractor comprising a second surface disposed parallel to the first propagation direction at an extractor duct height from the first surface, and a reflective extractor surface disposed to direct incident light into an extractor duct as an extracted light beam. The light distribution system still further includes an outlet light duct contiguous with the first surface and having an opposing third surface disposed at an outlet light duct height from the first surface, the outlet light duct height being greater than the extractor duct height capable of transporting an output light beam along the first propagation direction parallel to the first surface. The light distribution system still further includes a first light diverter forming a 45 degree angle between the second surface and the third surface and; and a second light diverter disposed parallel to the first light diverter, the second light diverter contacting the first surface and positioned such that a portion of the input light beam propagating from the inlet light duct to the outlet light duct reflects from the second light diverter and also reflects from the first light diverter.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a novel construction for homogenizing light in a mirror-lined light duct, in particular such as in a light duct having an increase in the cross-sectional duct area in the light propagation direction. The present disclosure also provides for an apparatus for light homogenization after a portion of the light in a duct has been extracted from the duct and/or diverted to a side duct. In one particular embodiment, the homogenizer includes two right angle isosceles (both angles opposite the right angle are 45 degrees) reflective prisms placed down-stream relative to the beam propagation direction from a diverter (or extractor) reflective prism. The double reflective prism system rotates the azimuth angle of a portion of the light rays passed by the diverter by 180 degrees, and preserves the polar angle relative to the duct axis. As a result of the rotated and non-rotated light, the angular non-homogeneity is improved in the light passed by the diverter.

In one particular embodiment, the present disclosure addresses the uniformity of light distribution in a light duct in a region where the cross-sectional area of the duct has been increased in the propagation direction. An increase in the cross-sectional area can cause the distribution of light across the duct cross-sectional area to become non-uniform, and may require the light to travel a significant distance down the duct to become uniformly distributed again. As disclosed herein, a light duct homogenizer can reduce the distance necessary for the light to become uniformly distributed throughout the duct again.

In some cases, it may be desired to increase the light duct cross-sectional to improve light transport over longer distances, since fewer light reflections occur as the cross-sectional area increases. In some cases, the light duct cross-sectional area decreases in a region where a portion of partially collimated light travelling through a light duct has been extracted and diverted to an intersecting duct, and then increases back to the original duct cross-sectional area after the extracted/diverted region. Light duct extractors can be generally applied to rectangular light ducts that intersect in a "Tee" configuration, as described for example in co-pending U.S. Patent Application Ser. No. 61/473,220 entitled LIGHT DUCT TEE EXTRACTOR, filed on Apr. 8, 2011, the entire disclosure of which is included herein.

Architectural daylighting using mirror-lined light ducts can deliver sunlight deep into the core of multi-floor buildings. Such mirror-lined light ducts can be uniquely enabled by the use of 3M optical films, including mirror films such as Vikuiti™ Enhanced Specular Reflector (ESR) film available from 3M Company, that can have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants.

In one particular embodiment, the light injected into the light duct is partially collimated light due to the method of light generation. This partially collimated light can generally be described as being included within a cone having border light rays within a collimation half-angle $\theta$ of the central light propagation direction. In some cases, solar radiation can be collected and concentrated to be injected into the light duct. In some cases, "artificial light" from various sources can be injected into the light duct. Such "artificial light" generated by any known technique such as halogen lamps, arc lamps, light emitting diodes (LEDs), incandescent lamps, and the like.

Relatively well-collimated light can be more effectively used in mirror-lined duct systems for transporting light. For example, as sunlight is concentrated, the collimation angle will increase from the input collimation angle of sunlight, about ¼ degree half-angle. Generally, the collimation half-angle $\theta$ of concentrated light, such as sunlight, passing into the light duct should be restricted to no greater than about 30 degrees, or no greater than about 25 degrees, or no greater than about 20 degrees, or even no greater than about 15 degrees. In one particular embodiment, the collimation half-angle $\theta$ can be about 18.4 degrees. The accuracy of tracking the sun, as well as the accuracy of the various optical components for injecting the light into the duct, all can contribute to the resulting collimation half-angle $\theta$.

Figure 1A:
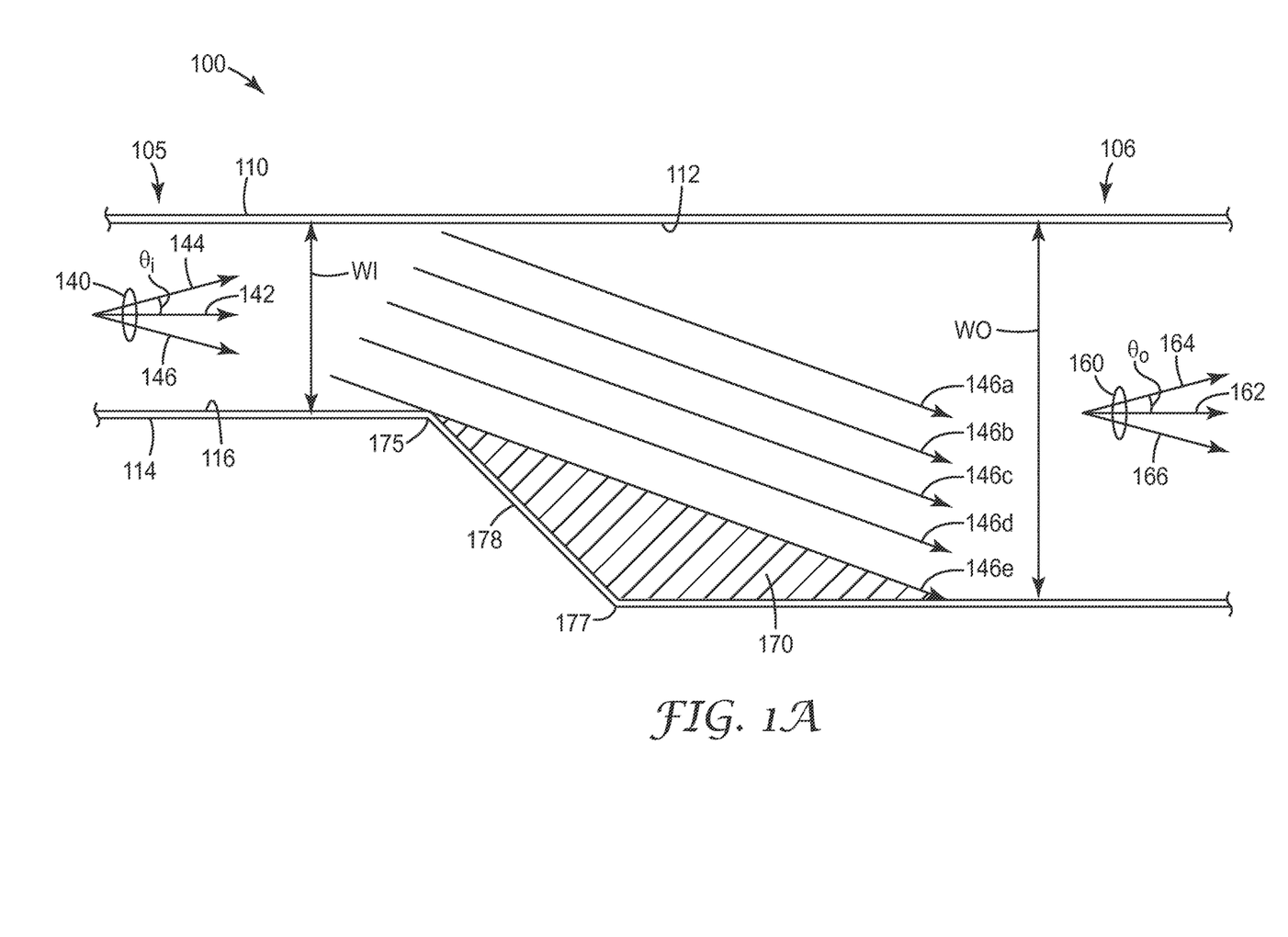
FIG. 1A shows a cross-sectional schematic of a light duct.

FIG. 1A shows a cross-sectional schematic of a light duct 100 that increases in cross-sectional area from an inlet light duct 105 to an outlet light duct 106. Light duct 100 includes a first surface 110 having a reflective interior 112 and a second surface 114 having a reflective interior 116. A first diverter 178 having a first edge 175 and a second edge 177 connects the second surface 114 as the duct widens from the inlet light duct 105 to the outlet light duct 106. In the inlet light duct 105, the second surface 114 is disposed at an inlet light duct height WI from the first surface 110; in the outlet light duct 106, the second surface 114 is disposed at an outlet light duct height WO from the first surface 110.

Inlet and outlet light ducts 105, 106, and first diverter 178, can be fabricated from any material commonly used for architectural ductwork, including, for example sheet metals such as steel, galvanized sheet metals, aluminum, plastics and the like. All of the interior surfaces 112, 116, of inlet and outlet light ducts 105, 106, are made from a material having a high specular reflectivity. A high specular reflectivity can enable efficient light transport along the considerable distances that can occur within architectural light ducts. In some embodiments, the highly specular reflectivity can be achieved using materials such as, for example, highly polished metals, metalized polymer films, and dielectric multilayer reflectors. In one particular embodiment, a multilayer optical film such as Vikuiti™ Enhanced Specular Reflector (ESR) film available from 3M Company can be a preferred material, particularly for lamination to a duct surface. In one particular embodiment, the light duct can be most effective by using very high efficiency mirrors such as, for example, Vikuiti™ Enhanced Specular Reflector (ESR) film available from 3M Company. In some cases, ESR film can be readily bent about a single axis of curvature, such as the curvatures common in rectangular cross-section light ducts.

An input light beam 140 having a central input light ray 142, a first boundary input light ray 144, and a second boundary input light ray 146 propagates along the inlet light duct 105, with the central input light ray 142 also defining a first propagation direction through the inlet light duct 105. The input light beam 140 includes a cone of light rays confined within an input collimation half-angle $\theta i$ of the central input light ray 142, and the first and second boundary input light rays 144, 146, define the extreme propagation directions of the input light beam 140. As the input light beam 140 passes the first edge 175 of the first diverter 178, the inlet light duct width WI increases to become the outlet light duct width WO, and the input light beam 140 becomes the output light beam 160. The output light beam 160 includes a central output light ray 162, a first boundary output light ray 164, and a second boundary output light ray 166 propagating along the outlet light duct 106, with the central output light ray 162 also defining a second propagation direction through the outlet light duct 106. The output light beam 160 includes a cone of light rays confined within an output collimation half-angle $\theta o$ of the central output light ray 162, and the first and second boundary output light rays 164, 166, define the extreme propagation directions of the output light beam 160. In one particular embodiment, the input collimation half-angle and the output collimation half-angle $\theta i$ and $\theta o$ are the same, although in some cases they may be different.

A representative set of second input boundary light rays 146a-e are shown to illustrate one manner in which a non-uniformity of the light distribution in the light duct can occur. As the input light beam 140 passes the first edge 175 of the first diverter 178 that expands into the outlet light duct 106, a shadow portion 170 is generated, where no light rays impinge the second surface 114. As one of skill in the art would realize, the absence of any light rays reflecting from this region causes a non-homogeneity in the light flux distribution within the outlet light duct 106 that propagates down the light duct. This non-uniform flux distribution can continue for a significant distance down the outlet light duct 106, and subsequently affect the distribution of light extracted or diverted from the duct.

Figure 1B:
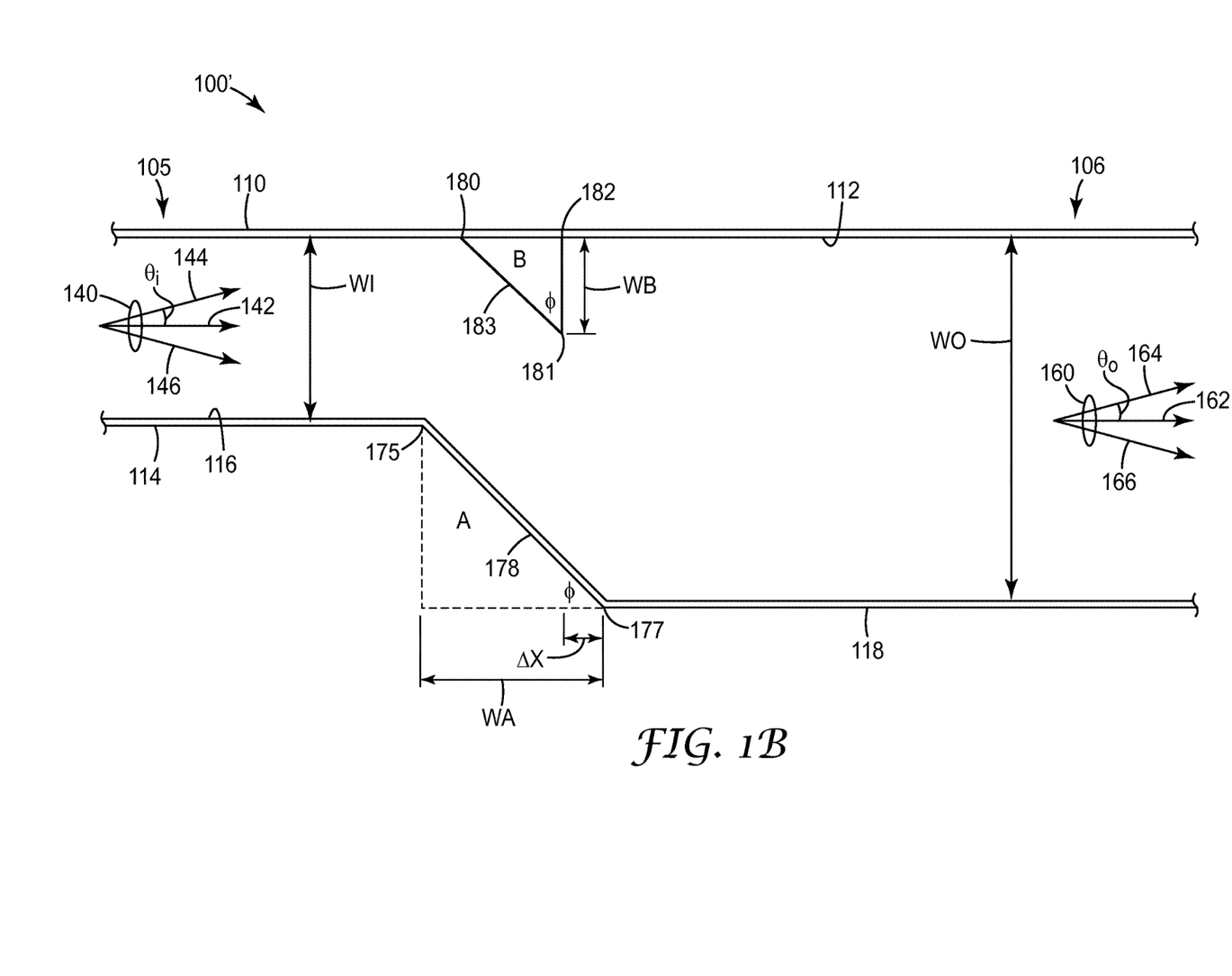
FIG. 1B shows a cross-sectional schematic of a light duct homogenizer.

FIG. 1B shows a cross-sectional schematic of a light duct homogenizer 100' in a light duct that increases in cross-sectional area from an inlet light duct 105 to an outlet light duct 106, according to one aspect of the disclosure. Light duct homogenizer 100' includes a first surface 110 having a reflective interior 112 and a second surface 114 having a reflective interior 116. A first diverter 178 having a first edge 175 and a second edge 177 connects the second surface 114 to a third surface 118 as the duct widens from the inlet light duct 105 to the outlet light duct 106. The first diverter 178 can be described as being the hypotenuse of a first isosceles right triangle "A" having an included angle $\phi$ and a side length WA, as shown in FIG. 1B. In one particular embodiment, the included angel φ can be 45 degrees. In the inlet light duct 105, the second surface 114 is disposed at an inlet light duct height WI from the first surface 110; in the outlet light duct 106, the third surface 118 is disposed at an outlet light duct height WO from the first surface 110.

A second diverter 183 having a third edge 180 in contact with the first surface 110, and a fourth edge 181 disposed such that the first diverter 178 and the second diverter 183 are parallel to each other. The second diverter 183 can be described as being the hypotenuse of a second isosceles right triangle "B" having the included angle φ and a side length WB, as shown in FIG. 1B. Although second isosceles right triangle "B" is shown to have a side extending in a perpendicular direction from the first surface from vertex 182 to fourth edge 181, it is to be understood that fourth edge 181 may instead be unattached to first surface 110. The second diverter 183 is positioned such that a portion of an input light beam 140 propagating from the inlet light duct 105 to the outlet light duct 106 that reflects from the second diverter 183, also reflects from the first diverter 178. In one particular embodiment, the fourth edge 181 of the second diverter 183 is positioned an offset distance Δx from the second edge 177 of the first diverter 178 to accommodate the two reflections, as described elsewhere.

Inlet and outlet light ducts 105, 106, first diverter 178, and second diverter 183 can be fabricated from any material commonly used for architectural ductwork, including, for example sheet metals such as steel, galvanized sheet metals, aluminum, plastics and the like. All of the interior surfaces 112, 116, of inlet and outlet light ducts 105, 106, are made from a material having a high specular reflectivity. A high specular reflectivity can enable efficient light transport along the considerable distances that can occur within architectural light ducts. In some embodiments, the highly specular reflectivity can be achieved using materials such as, for example, highly polished metals, metalized polymer films, and dielectric multilayer reflectors. In one particular embodiment, a multilayer optical film such as Vikuiti™ Enhanced Specular Reflector (ESR) film available from 3M Company can be a preferred material. In one particular embodiment, the light duct can be most effective by using very high efficiency mirrors such as, for example, Vikuiti™ Enhanced Specular Reflector (ESR) film available from 3M Company. In some cases, ESR film can be readily bent about a single axis of curvature, such as the curvatures common in rectangular cross-section light ducts.

An input light beam 140 having a central input light ray 142, a first boundary input light ray 144, and a second boundary input light ray 146 propagates along the inlet light duct 105, with the central input light ray 142 also defining a first propagation direction through the inlet light duct 105. The input light beam 140 includes a cone of light rays confined within an input collimation half-angle θi of the central input light ray 142, and the first and second boundary input light rays 144, 146, define the extreme propagation directions of the input light beam 140. As the input light beam 140 passes the first edge 175 of the first diverter 178, the inlet light duct width WI increases to become the outlet light duct width WO, and the input light beam 140 becomes the output light beam 160. The output light beam 160 includes a central output light ray 162, a first boundary output light ray 164, and a second boundary output light ray 166 propagating along the outlet light duct 106, with the central output light ray 162 also defining a second propagation direction through the outlet light duct 106. The output light beam 160 includes a cone of light rays confined within an output collimation half-angle θo of the central output light ray 162, and the first and second boundary output light rays 164, 166, define the extreme propagation directions of the output light beam 160. In one particular embodiment, the input collimation half-angle and the output collimation half-angle θi and θo are the same, although in some cases they may be different.

Figure 1C:
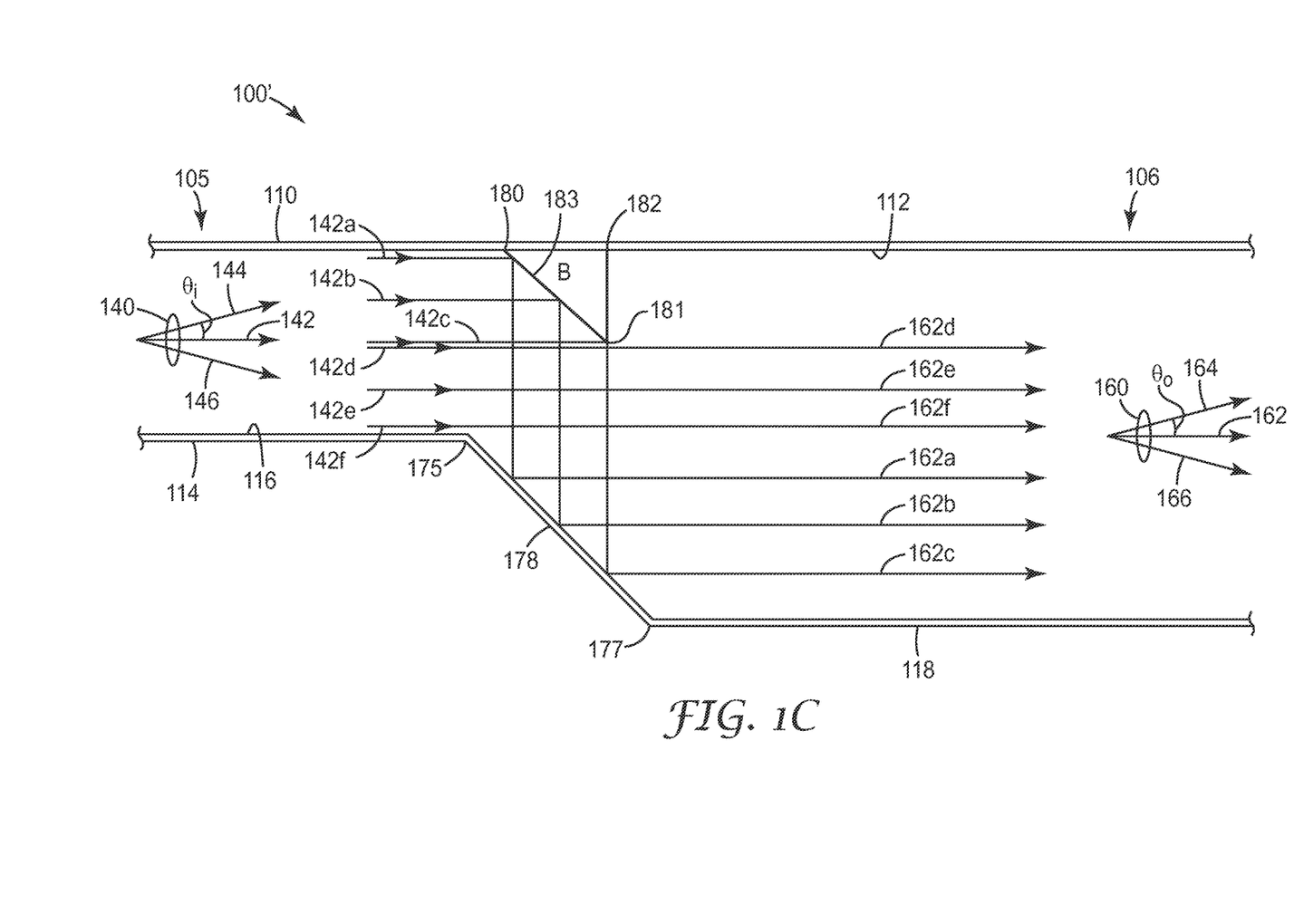
FIGS. 1C-1E shows representative light rays within a light duct homogenizer.
Figure 1D:
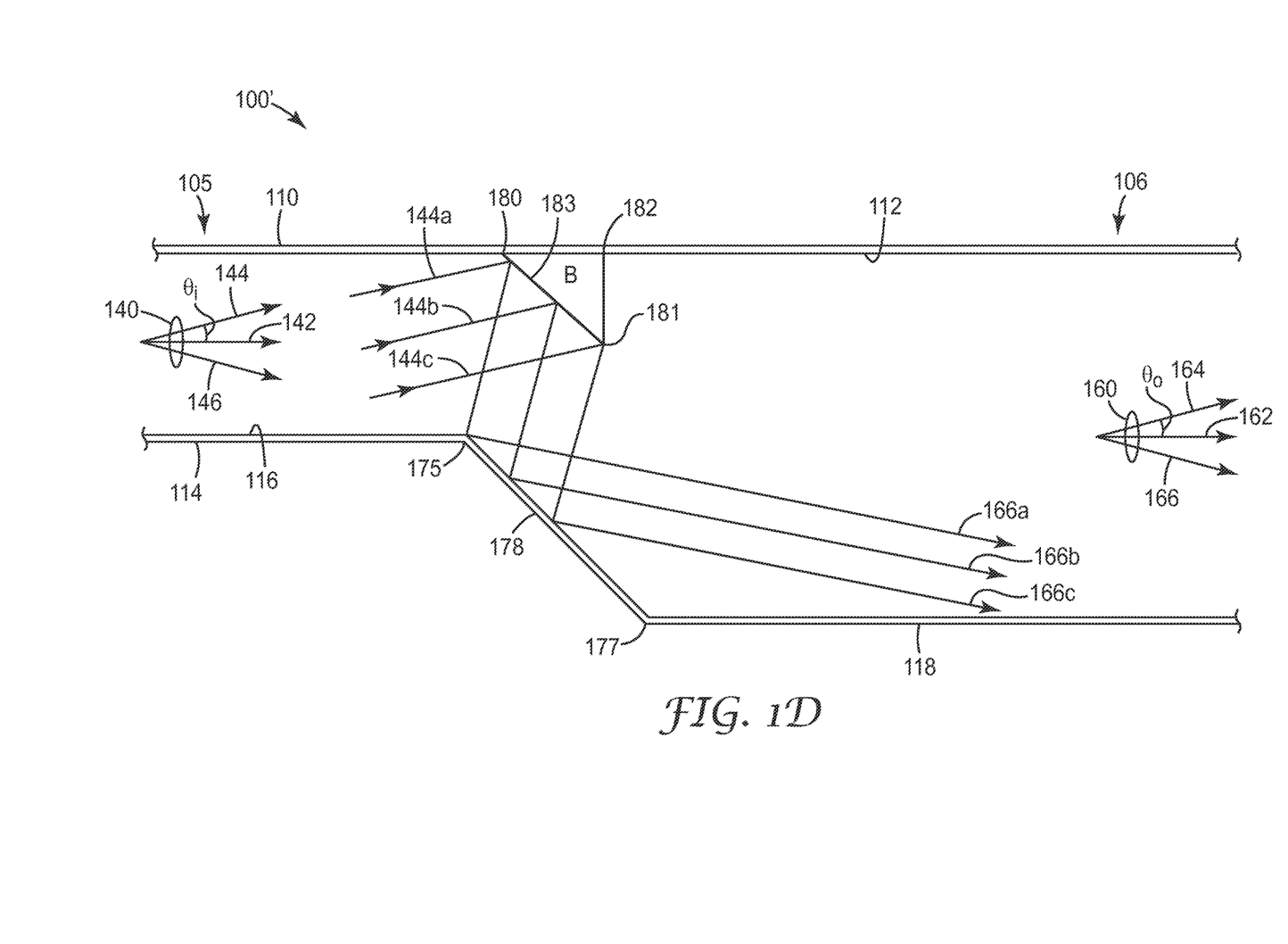
Figure 1E:
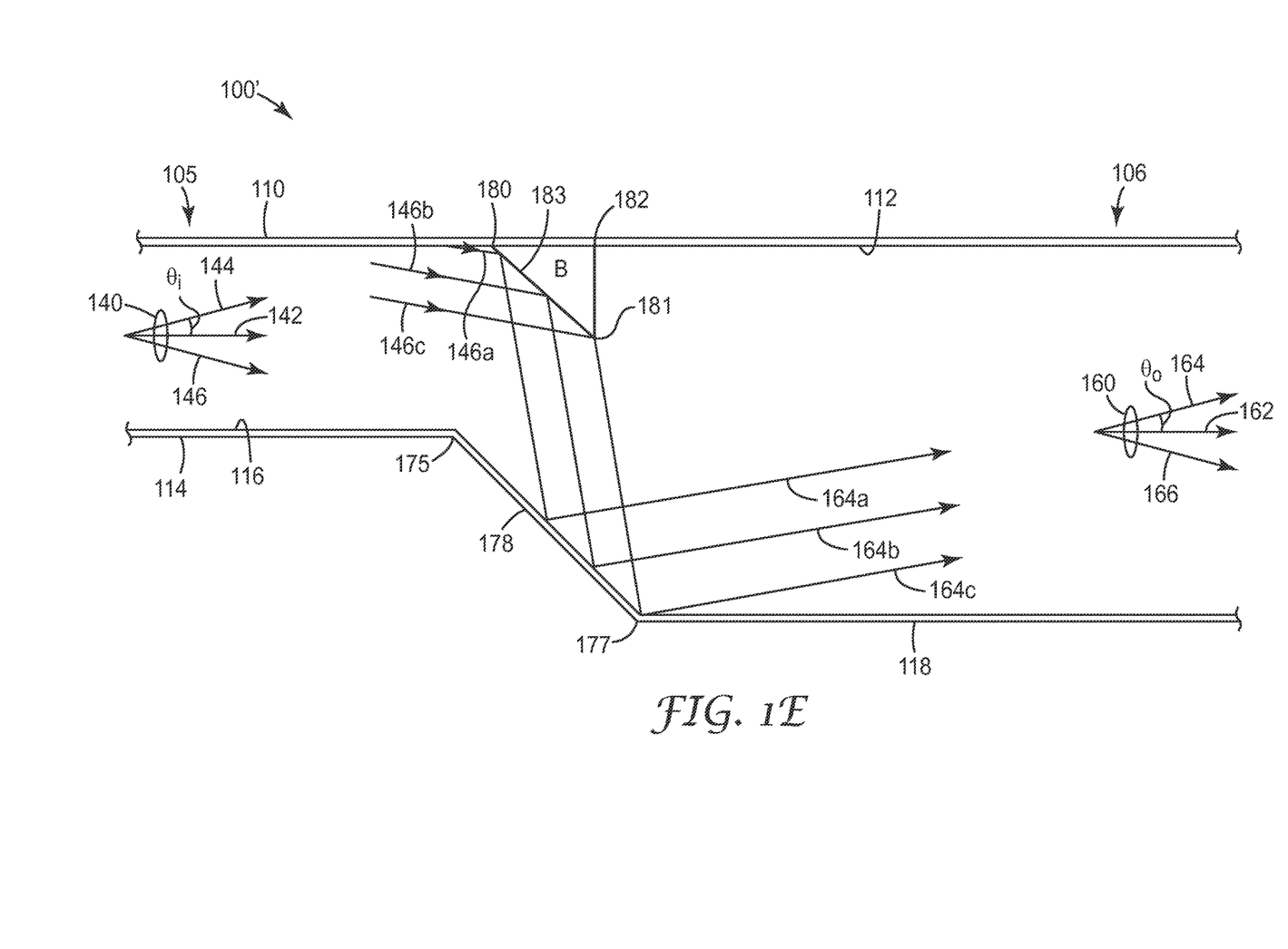

FIGS. 1C-1E shows representative light rays within a light duct homogenizer 100', and demonstrates the technique of improving the homogeneity of the light distribution in a widened duct, according to one aspect of the invention. Each of the elements 105-183 shown in FIGS. 1C-1E correspond to like-numbered elements shown in FIG. 1B, which have been described previously. For example, first surface 110 in FIGS. 1C-1E corresponds to first surface 110 in FIG. 1B, and so on. In FIG. 1C, a series of input light rays 142a-142f are shown to be travelling from inlet light duct 105 to outlet light duct 106 along the propagation direction of a central input light ray 142. Input light rays 142a-142c form a portion of the input light beam 140 that intercepts second diverter 183, reflects toward first diverter 178, and reflects again to become output light rays 162a-162c travelling through outlet light duct 106 along the propagation direction of a central output light ray 162. Input light rays 142d-142f form a portion of the input light beam 140 that travels through outlet light duct 106 becoming output light rays 162d-162f travelling along the propagation direction of a central output light ray 162. The light duct homogenizer has flipped the relative positions in the duct of the input light rays 142a-142c and 142d-142f as they pass through to the outlet light duct 106.

Turning now to FIG. 1D, a series of first boundary input light rays 144a-144c are shown to be travelling from inlet light duct 105 to outlet light duct 106 along the propagation direction of a first boundary input light ray 144. First boundary input light rays 144a-144c form a portion of the input light beam 140 that intercepts second diverter 183, reflects toward first diverter 178, and reflects again to become second boundary output light rays 166a-166c travelling through outlet light duct 106 along the propagation direction of second boundary output light ray 166. Second isosceles right triangle "B" is positioned with third edge 180 such that first boundary input light ray 144a that intercepts second diverter 183 at third edge 180 is reflected toward first diverter 178 at first edge 175 and directed into outlet light duct 106 as second boundary output light ray 166a within the collimation half-angle θ, as described elsewhere.

Turning now to FIG. 1E, second boundary input light rays 146b-146c are shown to be travelling from inlet light duct 105 to outlet light duct 106 along the propagation direction of a second boundary input light ray 146. Second boundary input light rays 146b-146c form a portion of the input light beam 140 that intercepts second diverter 183, reflects toward first diverter 178, and reflects again to become first boundary output light rays 164a-164c travelling through outlet light duct 106 along the propagation direction of first boundary output light ray 164. Second isosceles right triangle "B" is positioned with fourth edge 181 such that second boundary input light ray 146c that intercepts second diverter 183 at fourth edge 181 is reflected toward first diverter 178 at second edge 177 and directed into outlet light duct 106 within the collimation half-angle θ, as described elsewhere.

The double reflection configuration shown in FIGS. 1B-1E serves to flip the angle of a portion of the light rays relative to the axis of the light duct. For a perfect reflecting mirror this flip does not change the magnitude of the angle of the light rays relative to the axis of the light duct provided that certain design constraints are satisfied. The double reflection system rotates the azimuth angle of a portion of the light rays by 180 degrees and preserves the polar angle relative to the duct axis. The portion of rotated light is approximately proportional to the back fill factor "ΔB" as described elsewhere. The net effect of the rotated and non-rotated light is to remediate the angular non-homogeneity in the light passed. The degree of leveling of the angular distribution can be estimated and optimized using ray tracing software such as TracePro 7.0.4 (available from Lambda Research Corp, Littleton, Mass.), as shown elsewhere.

The offset distance Δx, as shown for example in FIG. 1B, is set so that second boundary input light ray 146c incident on the fourth edge 181 of second diverter 183 in second right triangle "B" is reflected to the second edge 177 of first diverter 178 in first right triangle "A", and is subsequently directed into the outlet light duct 106 as first boundary output light ray 164c. This ensures that no light within the injected beam collimation half-angle is reflected off the third surface 118 of the outlet light duct 106. This design constraint can be written as $$\Delta x = (WO - WB) \tan \theta$$

It is desired that the third edge 180 of second diverter 183 in second right triangle "B" be disposed such that second boundary input light ray 146a incident on the third edge 180 of second diverter 183 reflect toward first diverter 178 in first right triangle "A", and is subsequently directed into the outlet light duct 106 as first boundary output light ray 164a. This can ensure that there is no loss due to back-reflection or light propagating at high angles outside the incident beam collimation half-angle θ. This design constraint can be written as $$\frac{WA}{WO} \geq \tan \theta$$

Figure 2:
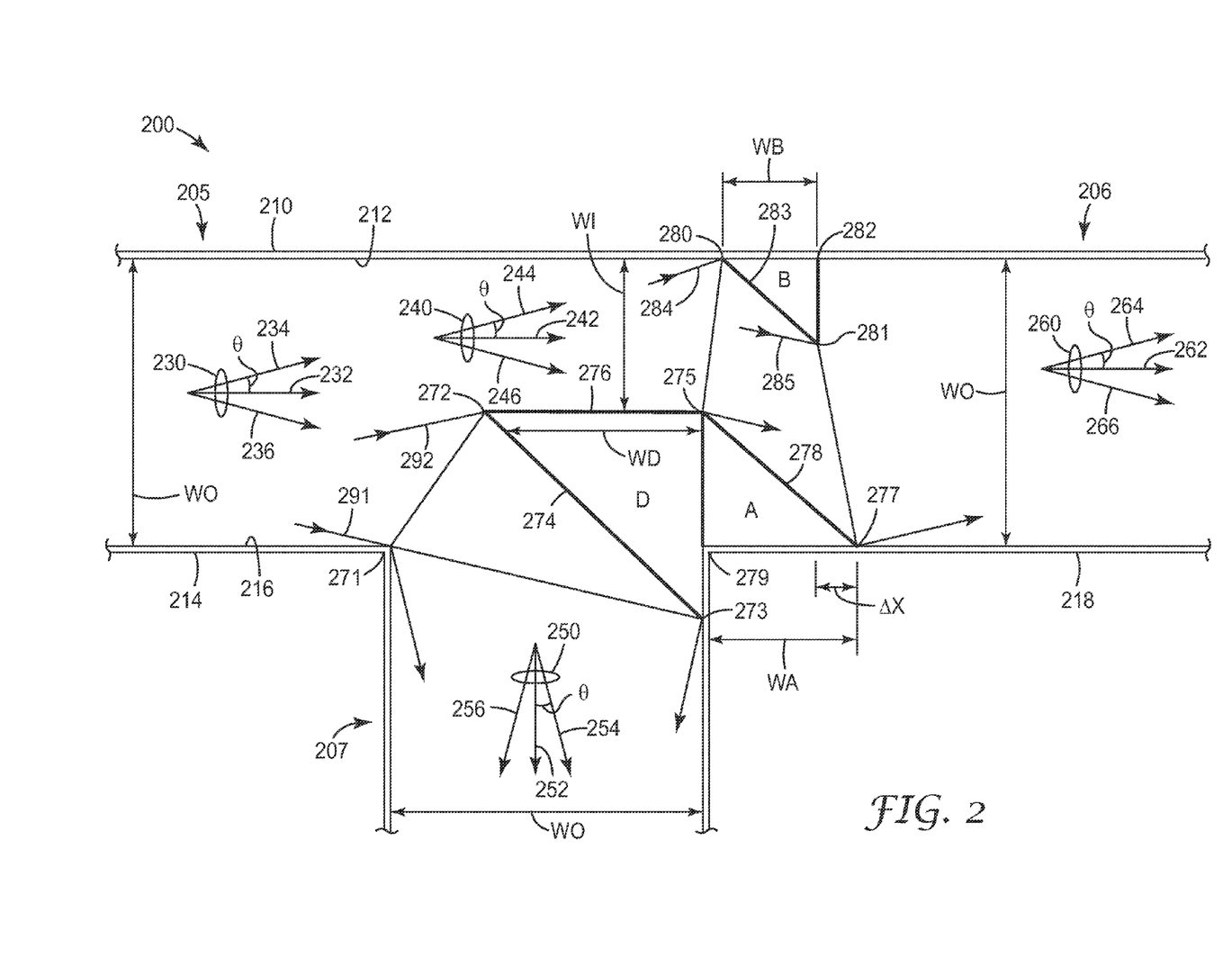
FIG. 2 shows a cross-sectional schematic of a light duct homogenizer and extractor.

FIG. 2 shows a cross-sectional schematic of a light duct 200 having a homogenizer used with a light extractor "D" that diverts light beams into an extractor duct 207, according to one aspect of the disclosure. Light extractor "D" includes a reflective extractor surface 274 and a second extractor surface 276 that creates a narrowed inlet light duct region having a separation "WI" between the first surface 210 and the second extractor surface 276. Each of the elements 205-283 shown in FIG. 2 corresponds to like-numbered elements shown in FIG. 1B, which have been described previously. For example, first surface 210 in FIG. 2 corresponds to first surface 110 in FIG. 1B, and so on. In FIG. 2, a light extractor "D" diverts a portion of the input light beam 230 propagating through inlet light duct 205 in the propagation direction of central input light ray 232, into an extracted light beam 250 propagating through an extractor duct 207 in the propagation direction of central extracted light ray 252 as described, for example, in co-pending U.S. Patent Application Ser. No. 61/473,220 entitled LIGHT DUCT TEE EXTRACTOR. Extractor duct 207 extends in a perpendicular direction from the propagation direction of central input light ray 232, such that the central extracted light ray 252 of extracted light beam 250 propagates perpendicular to central input light ray 232, and the extractor duct 207 intersects inlet light duct 205 at first corner 271 and also intersects outlet light duct 206 at second corner 279.

The light extractor "D" includes a reflective extractor surface 274 having a first extractor edge 272 within the inlet light duct 205, and a second extractor edge 273 in contact with the extractor duct 207. Light extractor "D" can be described as a right isosceles triangle having two sides adjacent the right angle each having a diverter width "WD" that extends between first extractor edge 272 and first edge 275 (and also between first edge 275 and second extractor edge 273, as shown in the figure). The reflective extractor surface 274 is positioned such that a first boundary light ray 292 propagating at the collimation half-angle θ from the central input light ray 232, intercepts the reflective extractor surface 274 at first extractor edge 272 such that the ray is reflected into the extractor duct 207 at first corner 271. The reflective extractor surface 274 is further positioned such that a second boundary light ray 291 propagating at the collimation half-angle θ from the central input light ray 232, passes first corner 271 and intercepts the reflective extractor surface 274 at second extractor edge 273 such that the ray is reflected into the extractor duct 207.

The presence of the light extractor "D" within the inlet light duct 205 creates a narrowed portion of the duct having a height WI between the first surface 210 and the second extractor surface 276, such that the portion of the input light beam 230 that is not diverted into the extractor duct 207 continues as transmitted input light beam 240 propagating toward the outlet light duct 206 through the narrowed duct portion. As the transmitted input light beam 240 begins to enter the outlet light duct 206, the beam is homogenized as described elsewhere: a portion reflects from the second diverter "B" toward first diverter "A". A first boundary transmitted input light ray 284 propagating within collimation half-angle θ of transmitted central light ray 242 intercepts second diverter 283 at third edge 280 and reflects toward first edge 275 of first diverter 278 and is transmitted into outlet light duct 206 in the direction of second boundary output ray 266. A second boundary transmitted input light ray 285 propagating within collimation half-angle θ of transmitted central light ray 242 intercepts second diverter 283 at fourth edge 281 and reflects toward second edge 277 of first diverter 278 and is transmitted into outlet light duct 206 in the direction of first boundary output ray 264. As a result of the reflections from the first and second diverters 283, 278, the output light beam 260 becomes homogenized in a shorter distance down the outlet light duct 206 than a similar light duct 200 that does not include the diverters.

EXAMPLES

A model was used to study the optical performance of diverters and homogenizers in light transport ducts similar to the extractor/diverter duct shown in FIG. 2, and reference numbers refer to elements already described with reference to that figure. The model used included 3 inch (7.62 cm) square inlet, outlet, and extractor ducts 205, 206, 207 (WO=3 inches). Lambertian light having a collimation half-angle θ of 15 degrees was injected into the inlet light duct 205 at a position 12 inches (30.48 cm) from first corner 271. An ESR film was used on all surfaces, resulting in a specular reflectance of 97% and a diffuse Lambertian reflectance of 2%. The spatial distribution (that is, uniformity) of the light was determined in the outlet light duct 206 at a position located 12 inches (30.48 cm) to the right of second corner 279, and in the extractor duct 207 at a position located 12 inches (30.48 cm) down from first corner 271.

The diverter fill fraction (Δd=WA/WO) was varied from 0.2 to 0.8 units, and the homogenizer fill fraction (ΔB=WB/WI) was varied from 0 (that is, no homogenizer) to 0.8 units at each of the diverter fill fraction values to generate a series of parametric curves. Post-processing of raw binary ray dumps from TracePro 7.0.4 for the exit and down side end caps was performed using custom software developed in Matlab 7.12, as known to one of skill in the art.

A parametric study using computational ray tracing was performed over the tensor product of the set of values for the diverter fill fraction and a set of values for the homogenizer back fill fraction. Ray traces for the cases with no homogenizer were also computed. For each case the combined cumulative efficiency and loss for diverted and passed radiance and the average radiance for the exit end cap (passed through radiance) was calculated and plotted. For each diverter fill fraction, the homogenizer fill fraction yielding the best uniformity over the input beam cut-off angle was chosen by visual inspection of the computed radiant intensity profiles. An optimal dual prism homogenizer was found for each case that provides a significant leveling of the ripples in the angular distribution induced by the diverter/extractor.

Figure 3A:
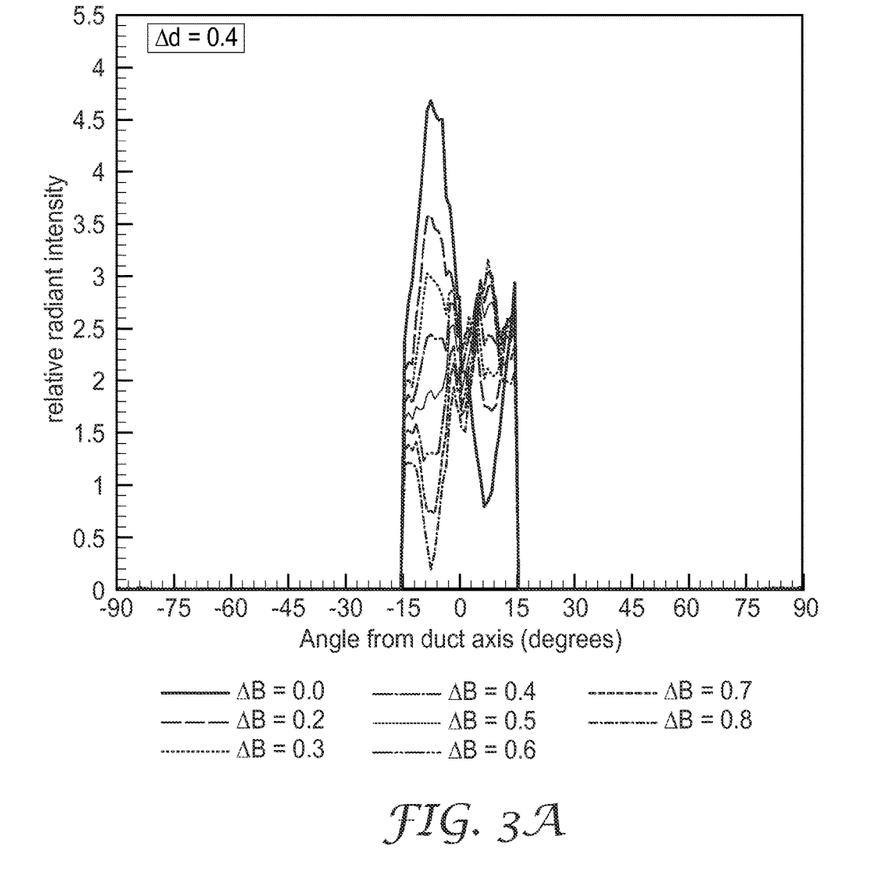
FIG. 3A is a plot showing an example of spatial light distribution in a light duct.

FIG. 3A is a plot showing an example of spatial light distribution in the light duct as a function of homogenizer fill fraction for a diverter fill fraction $\Delta d=0.4$. From the various parametric curves for $\Delta B=0$, 0.2, 0.4, 0.5, 0.6, 0.7, and 0.8, a best value is chosen to represent the minimum variation of the radiant intensity over the angle from the duct axis (corresponding to angular positions within the collimation half-angle $\theta$).

Figure 3B:
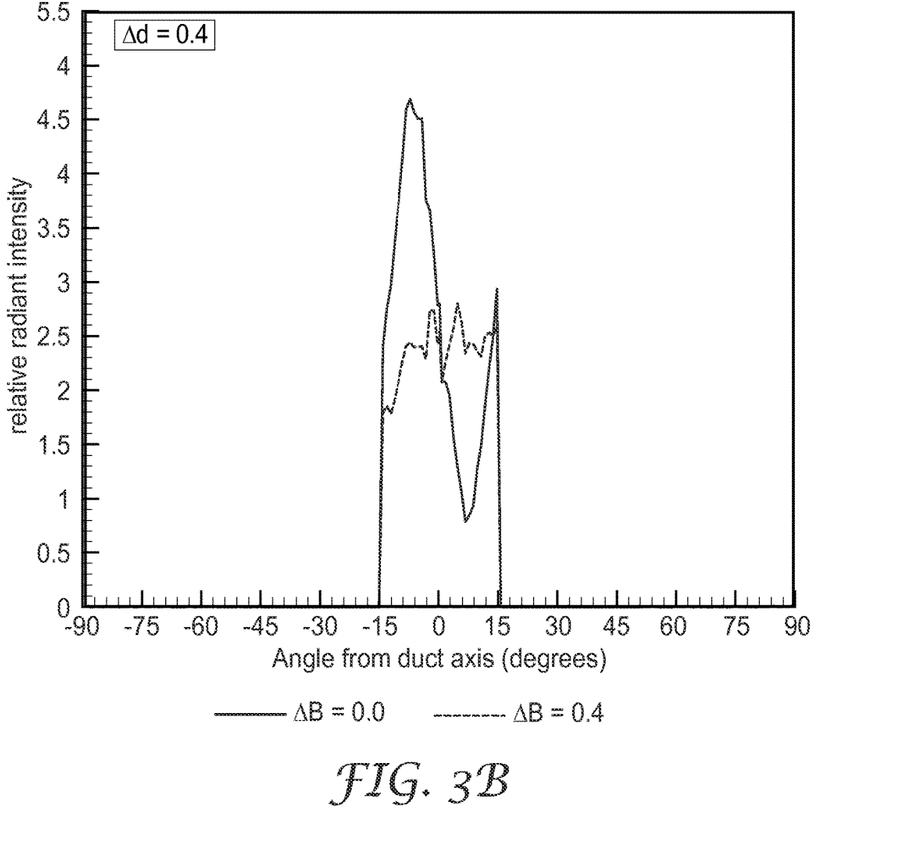
FIG. 3B is a plot showing a selected optimum parameter of FIG. 3A.
Figure 3C:
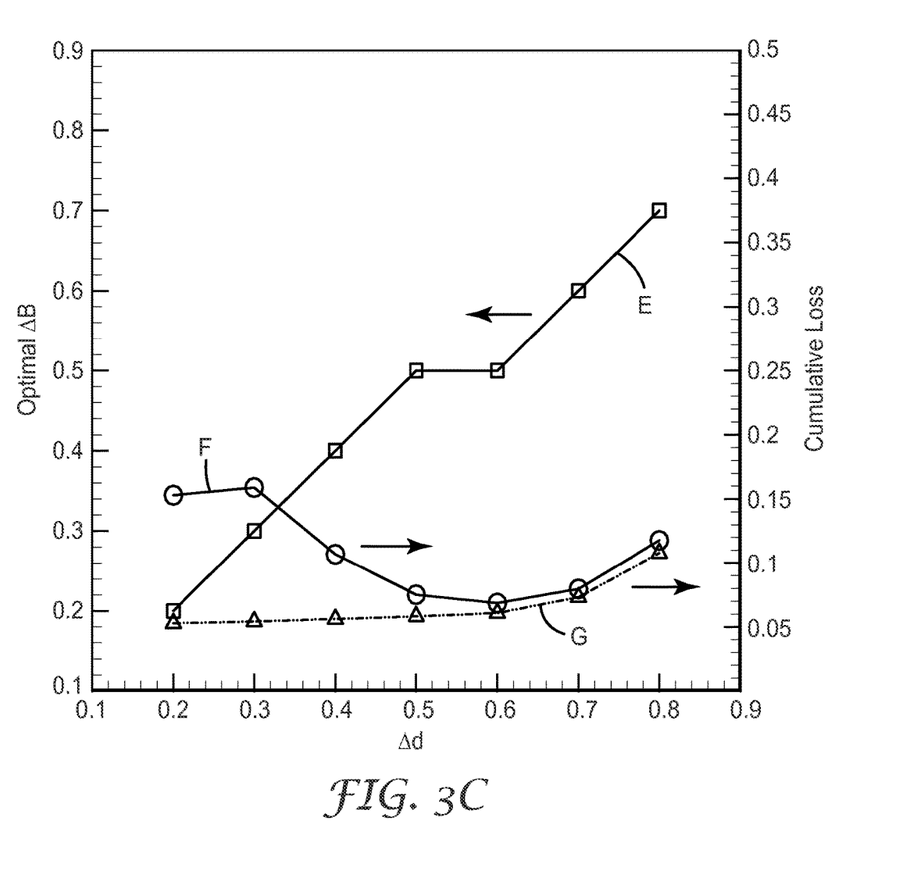
FIG. 3C is a plot showing optimal homogenizer fill fraction vs diverter fill fraction.

FIG. 3B is a plot showing a selected optimum parameter $\Delta B=0.4$ and also for the case of no homogenizer ($\Delta B=0$) for the diverter fill fraction $\Delta d=0.4$ of FIG. 3A. A series of these optimum values were used to generate FIG. 3C, which is a plot showing optimal homogenizer fill fraction vs diverter fill fraction (labeled "E"), and the total cumulative loss with (labeled "F") and without (labeled "G") the optimal homogenizer present. Of particular interest is the result that for $\Delta d \geq 0.2$, the cumulative insertion loss for the optimal homogenizer is less than 10%, for $\Delta d \geq 0.4$ the cumulative insertion loss is less than 5%, for $\Delta d \geq 0.5$ the cumulative insertion loss is less than 2%, and for $\Delta d \geq 0.6$ the cumulative insertion loss is less than 1%.

Following are a list of embodiments of the present disclosure.

Item 1 is a light duct homogenizer, comprising: an inlet light duct having a first surface and an opposing second surface disposed at an inlet light duct height from the first surface; an outlet light duct contiguous with the first surface and having an opposing third surface disposed at an outlet light duct height from the first surface, the outlet light duct height being greater than the inlet light duct height; a first light diverter forming a 45 degree angle between the second surface and the third surface; and a second light diverter disposed parallel to the first light diverter, the second light diverter contacting the first surface and positioned such that a portion of a light beam propagating from the inlet light duct to the outlet light duct that reflects from the second light diverter, also reflects from the first light diverter.

Item 2 is the light duct homogenizer of item 1, wherein the light beam propagating within a collimation half-angle $\theta$ of a propagation direction parallel to the first surface becomes an output light beam propagating within the collimation half-angle $\theta$ in the outlet light duct.

Item 3 is the light duct homogenizer of item 1 or item 2, wherein each of the inlet and outlet light ducts include a first and a second rectangular cross-section, respectively.

Item 4 is the light duct homogenizer of item 1 to item 3, wherein the first and second light diverters each comprise a planar reflector.

Item 5 is the light duct homogenizer of item 1 to item 4, wherein the second light diverter comprises a triangular reflector.

Item 6 is the light duct homogenizer of item 2 to item 5, wherein the collimation half-angle $\theta$ is between about 0 degrees and about 30 degrees.

Item 7 is the light duct homogenizer of claim 2 to item 5, wherein the collimation half-angle $\theta$ is between about 10 degrees and about 20 degrees.

Item 8 is the light duct homogenizer of item 2 to item 5, wherein the collimation half-angle $\theta$ is about 18.4 degrees.

Item 9 is a light distribution system comprising the light duct homogenizer of item 1 to item 8.

Item 10 is a light distribution system, comprising: an inlet light duct having a first surface and an inlet light duct height perpendicular to the first surface, the inlet light duct capable of transporting an input light beam along a first propagation direction parallel to the first surface; a light extractor disposed in the inlet light duct, the light extractor comprising a second surface disposed parallel to the first propagation direction at an extractor duct height from the first surface, and a reflective extractor surface disposed to direct incident light into an extractor duct as an extracted light beam; an outlet light duct contiguous with the first surface and having an opposing third surface disposed at an outlet light duct height from the first surface, the outlet light duct height being greater than the extractor duct height capable of transporting an output light beam along the first propagation direction parallel to the first surface; a first light diverter forming a 45 degree angle between the second surface and the third surface and; and a second light diverter disposed parallel to the first light diverter, the second light diverter contacting the first surface and positioned such that a portion of the input light beam propagating from the inlet light duct to the outlet light duct reflects from the second light diverter and also reflects from the first light diverter.

Item 11 is the light distribution system of item 10, wherein the input light beam propagating within a collimation half-angle $\theta$ of the first propagation direction separates to become the output light beam propagating within the collimation half-angle $\theta$ in the outlet light duct and an extracted light beam.

Item 12 is the light distribution system of item 10 or item 11, wherein each of the inlet and outlet light ducts include a first and a second rectangular cross-section, respectively.

Item 13 is the light distribution system of item 10 to item 12, wherein the first and second light diverters each comprise a planar reflector.

Item 14 is the light distribution system of item 10 to item 13, wherein the second light diverter comprises a triangular reflector.

Item 15 is the light distribution system of item 11 to item 14, wherein the collimation half-angle $\theta$ is between about 0 degrees and about 30 degrees.

Item 16 is the light distribution system of item 11 to item 14, wherein the collimation half-angle $\theta$ is between about 10 degrees and about 20 degrees.

Item 17 is the light distribution system of item 11 to item 14, wherein the collimation half-angle $\theta$ is about 18.4 degrees.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light duct homogenizer, comprising:
an inlet light duct having a first surface and an opposing second surface disposed at an inlet light duct height from the first surface;
an outlet light duct contiguous with the first surface and having an opposing third surface disposed at an outlet light duct height from the first surface, the outlet light duct height being greater than the inlet light duct height;
a first light diverter forming a 45 degree angle between the second surface and the third surface; and
a second light diverter disposed parallel to the first light diverter, the second light diverter contacting the first surface and positioned such that a portion of a light beam propagating from the inlet light duct to the outlet light duct that reflects from the second light diverter, also reflects from the first light diverter, and
wherein a length of the second light diverter extending in a perpendicular direction from the first surface is less than the inlet light duct height.

2. The light duct homogenizer of claim 1, wherein the light beam propagating within a collimation half-angle θ of a propagation direction parallel to the first surface becomes an output light beam propagating within the collimation half-angle θ in the outlet light duct.

3. The light duct homogenizer of claim 1, wherein each of the inlet and outlet light ducts include a first and a second rectangular cross-section, respectively.

4. The light duct homogenizer of claim 1, wherein the first and second light diverters each comprise a planar reflector.

5. The light duct homogenizer of claim 1, wherein the second light diverter comprises a triangular reflector having a reflective hypotenuse disposed parallel to the first light deflector.

6. The light duct homogenizer of claim 2, wherein the collimation half-angle θ is between about 0 degrees and about 30 degrees.

7. The light duct homogenizer of claim 2, wherein the collimation half-angle θ is between about 10 degrees and about 20 degrees.

8. The light duct homogenizer of claim 2, wherein the collimation half-angle θ is about 18.4 degrees.

9. A light distribution system comprising the light duct homogenizer of claim 1.

10. A light distribution system, comprising:
an inlet light duct having a first surface and an inlet light duct height perpendicular to the first surface, the inlet light duct capable of transporting an input light beam along a first propagation direction parallel to the first surface;
a light extractor disposed in the inlet light duct, the light extractor comprising a second surface disposed parallel to the first propagation direction at an extractor duct height from the first surface, and a reflective extractor surface disposed to direct incident light into an extractor duct as an extracted light beam;
an outlet light duct contiguous with the first surface and having an opposing third surface disposed at an outlet light duct height from the first surface, the outlet light duct height being greater than the extractor duct height capable of transporting an output light beam along the first propagation direction parallel to the first surface;
a first light diverter forming a 45 degree angle between the second surface and the third surface and; and
a second light diverter disposed parallel to the first light diverter, the second light diverter contacting the first surface and positioned such that a portion of the input light beam propagating from the inlet light duct to the outlet light duct reflects from the second light diverter and also reflects from the first light diverter, and
wherein a length of the second light diverter extending in a perpendicular direction from the first surface is less than the inlet light duct height.

11. The light distribution system of claim 10, wherein the input light beam propagating within a collimation half-angle θ of the first propagation direction separates to become the output light beam propagating within the collimation half-angle θ in the outlet light duct and the extracted light beam.

12. The light distribution system of claim 10, wherein each of the inlet and outlet light ducts include a first and a second rectangular cross-section, respectively.

13. The light distribution system of claim 10, wherein the first and second light diverters each comprise a planar reflector.

14. The light distribution system of claim 10, wherein the second light diverter comprises a triangular reflector having a reflective hypotenuse disposed parallel to the first light deflector.

15. The light distribution system of claim 11, wherein the collimation half-angle θ is between about 0 degrees and about 30 degrees.

16. The light distribution system of claim 11, wherein the collimation half-angle θ is between about 10 degrees and about 20 degrees.

17. The light distribution system of claim 11, wherein the collimation half-angle θ is about 18.4 degrees.

* * * * *